United States Patent  (10) Patent No.: US 7,072,638 B2
Benco et al.  (45) Date of Patent: Jul. 4, 2006

(54) NETWORK SUPPORT FOR MINUTE USAGE ALERTING

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 206 days.

(21) Appl. No.: 10/726,060

(22) Filed: Dec. 2, 2003

(65) Prior Publication Data

US 2005/0118988 A1 Jun. 2, 2005

(51) Int. Cl.
*H04M 11/00* (2006.01)
(52) U.S. Cl. .................. 455/405; 455/403; 379/111
(58) Field of Classification Search ................ 455/405, 455/403; 379/111
See application file for complete search history.

(56) References Cited

U.S. PATENT DOCUMENTS 6,597,774 B1* 7/2003 Jennings et al. ....... 379/114.07

* cited by examiner

*Primary Examiner*—Joseph Feild
*Assistant Examiner*—S. Smith

(57) ABSTRACT

In general terms, one embodiment of the method is for automatically notifying a subscriber that the subscriber has talked on a mobile terminal for a subscriber-defined amount of time. The method may have the steps of: defining an interval for at least one category of usage of a mobile terminal that is operatively connected to a telecommunication network; storing, at the telecommunication network, the defined interval for the at least one category of usage of the mobile terminal; monitoring, by the telecommunication network, a time that a call has been active on the mobile terminal; comparing the time that the call has been active to the stored at least one interval; and sending a predetermined notification signal from the telecommunication system to the mobile terminal when the time that the call has been active exceeds the stored interval. The system implements the method.

18 Claims, 4 Drawing Sheets

NETWORK SUPPORT FOR MINUTE USAGE ALERTING

TECHNICAL FIELD

The present invention relates to wireless telephony in general, and, more particularly, to a method and system for automatically notifying a subscriber that the subscriber has talked on a mobile terminal for a subscriber defined amount of time.

BACKGROUND OF THE INVENTION

Wireless telephones, which include both cellular telephones and the higher frequency personal communication devices are growing in numbers and also shrinking in size and weight. The growth in numbers is influenced by the convenience and the per call cost of wireless telephones with respect to pagers and wire line telephones or coin telephones for completing calls, especially when the user is away from home or office.

Typically during a call, mobile subscribers focus their attention on their conversations and do not realize that they may have talked on their cell phones longer than they wanted to with regard to their allotted monthly airtime minutes. For example, a mobile subscriber may have 150 monthly airtime minutes. If the mobile subscriber does not pay attention to the number of minutes that he has talked, he may talk for 30 minutes and not realize he has used up 20% of his monthly airtime minutes in just one conversation. It is very difficult to keep track of the airtime minutes during a conversation.

Thus, prior art mobile phones and similar devices have a significant drawback. There is therefore a need in the art for an improved method and system for automatically notifying a subscriber that the subscriber has talked on a mobile terminal for a predetermined amount of time.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, one embodiment of the present method is for automatically notifying a subscriber that the subscriber has talked on a mobile terminal for a subscriber-defined amount of time. The method has the steps of: defining an interval for at least one category of usage of a mobile terminal that is operatively connected to a telecommunication network; storing, at the telecommunication network, the defined interval for the at least one category of usage of the mobile terminal; monitoring, by the telecommunication network, a time that a call has been active on the mobile terminal; comparing the time that the call has been active to the stored at least one interval; and sending a predetermined notification signal from the telecommunication system to the mobile terminal when the time that the call has been active exceeds the stored interval.

Also, in general terms, one embodiment of the present system is for providing automatic notification, by a telecommunications network, to a subscriber that the subscriber has talked on a mobile terminal for a subscriber-defined amount of time. In one embodiment, the system may have the following elements: a mobile terminal that is operatively connected to a telecommunication network; a call controller in the telecommunication network for controlling a call for the mobile terminal; a plurality of categories of usage of a mobile terminal; a respective interval for each category of the plurality of categories of usage; a storage in the telecommunication network operatively connected to the call controller, the defined intervals and the respectively associated categories of usage being stored in the storage; determination module operatively connected to the storage and to the call controller, the determination module determining for the call a current applicable category of the plurality of categories for the mobile terminal; monitoring module operatively connected to the call controller, the monitoring module monitoring a time that the call has been active on the mobile terminal; comparator module operatively connected to the monitoring module and to the storage, the comparator module comparing the time the call has been active to the stored interval that is associated with the current applicable category; and notification module operatively connected to the comparator module and to the call controller, the notification module sending a predetermined notification signal from the telecommunication system to the mobile terminal when the time that the call has been active exceeds the stored interval that is associated with the current applicable category.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

Embodiments of the present method and system allows the telecommunication network to automatically notify a subscriber that they have talked on their mobile terminal for a subscriber-defined amount of time. For example, the mobile subscriber would define an interval or intervals for which they would like to be given a notice from the network that they have talked for a certain amount of time. For instance, after 5 minutes on a call, the network may send the mobile subscriber a subscriber-selected tone or announcement to inform them that they have talked for 5 minutes.

Advantageously, the capabilities of the network are used to automatically play a prerecorded tone or announcement for the mobile subscriber every 5 minutes (or whatever interval the subscriber defines) to assist the subscriber in managing minutes of usage for a current month's billing cycle. This may be an optional feature that the mobile subscriber pays for. The subscriber in some embodiments may predefine the interval at which the network would send a tone or announcement to the subscriber. The subscriber may also predefine the tone or announcement that the subscriber would like to be sent from the network, and the subscriber may further define the category of categories of minutes of usage for which this feature would apply. That is, the subscriber may want to set up different tone/announcement intervals for prime time and nights and weekend hours.

Figure 1:
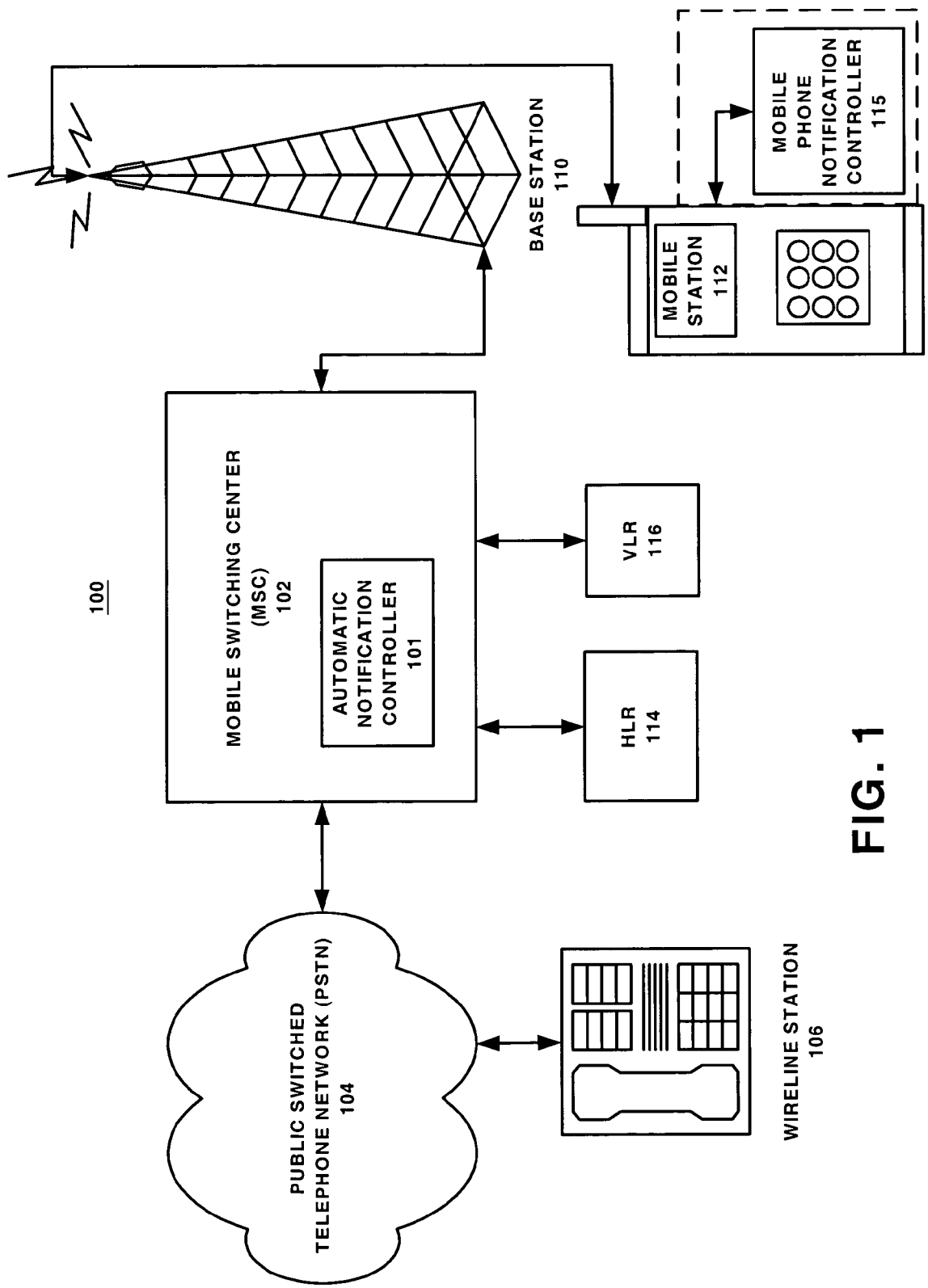
FIG. 1 depicts a block diagram illustrative of a mobile switching center, base station and mobile station for use with the present method and system.

Referring to FIG. 1, a system 100 is depicted for automatically notifying a subscriber that the subscriber has talked on a mobile terminal (also referred to as mobile phone, a cell phone, mobile handset, car phone) for a subscriber-defined amount of time. The system 100 has a mobile switching center (MSC) 102. The system may be, or may be part of, one or more of a telephone network, a local area network ("LAN"), the Internet, and a wireless network. In the depicted embodiment, a public switched telephone network (PSTN) 104 is connected to MSC 102. The PSTN 104 routes calls to and from mobile users through the MSC 102. The PSTN 104 also routes calls from and to wireline stations 106. The MSC 102 is also connected to one or more base stations (BS) 110. Each of the base stations 110 communicates with mobile station(s) 112 in its service area. The PSTN 104 generally can be implemented as the worldwide voice telephone network accessible to all those with telephones and access privileges (e.g., AT&T long distance network).

Each of the mobile stations 112 has a home location register (HLR) 114 where data about each of the mobile stations 112 resides. Some of the mobile stations 112 may be remotely located from their home location, and in that case, a visiting location register (VLR) 116 is set up locally for each mobile station 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile station 112 may be implemented as a cellular device, personal communication device, short message service device or wireless communications device (e.g., a wireless personal digital assistant).

The MCS 102 may have, or be operatively connected to, components of a system for automatically notifying a subscriber that the subscriber has talked on a mobile terminal for a subscriber-defined amount of time (for example, notification controller 101 in the MCS 102 and notification controller 115 in the mobile station 112).

Figure 2:
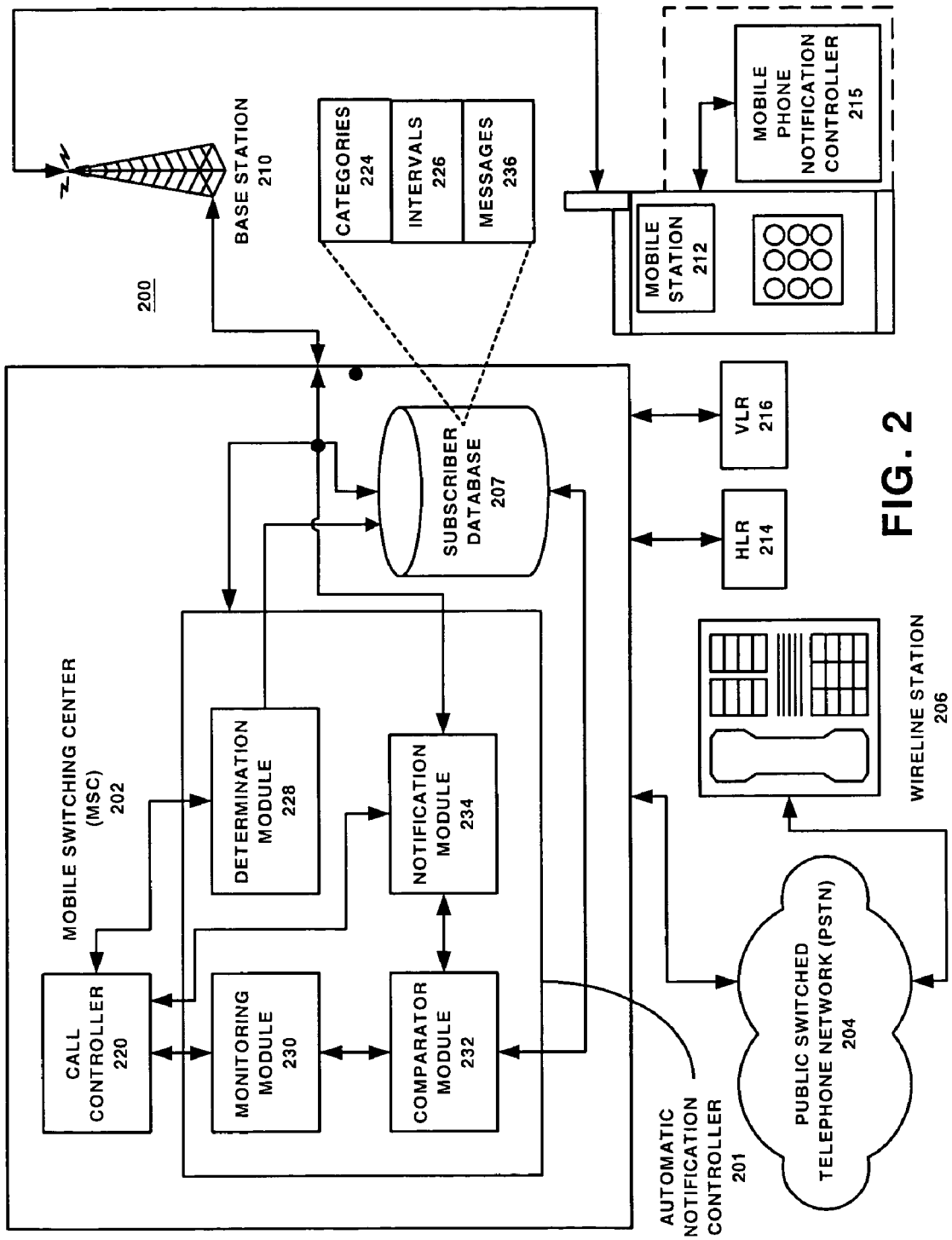
FIG. 2 illustrates a more detailed block diagram illustrative of a mobile switching center, base station, and mobile station according to one embodiment of the present method and system.

Referring to FIG. 2, a system 200 is shown for automatically notifying a subscriber that the subscriber has talked on a mobile terminal for a subscriber-defined amount of time. FIG. 2 depicts a block diagram that is illustrative of a mobile switching center 202 operatively connected to PSTN 204, base station 210, and mobile station 212 according to one embodiment of the present method and system. The PSTN 204 routes calls to and from mobile users through the MSC 202, as well as routing calls from and to wireline stations 206. The MSC 202 is connected to one or more base stations 210. The base station(s) 210 communicates through the air to mobile stations 212, which may be of a cellular telephone type or of the wider bandwidth personal communication device type. Mobile stations 212 may be wireless handsets or automobile mounted stations the same as those shown in FIG. 1. At least the MSC 202 and the base station 210 are part of a telecommunication network. The MSC 202 has operatively connected thereto a VLR 216 and a HLR 214 that interface with the mobile station 212.

The embodiment of the system for providing automatic notification, by a telecommunications network, to a subscriber that the subscriber has talked on a mobile terminal for a subscriber-defined amount of time, may have the following elements.

The MSC 202 may have a call controller 220 that controls a call for the mobile terminal 212. The subscriber, via a mobile terminal notification controller 215 in the mobile terminal 212, may define a plurality of categories 224 of usage of the mobile terminal 212, and a respective interval of a plurality of intervals 226 for each category of the plurality of categories 224 of usage. Storage 207, such as the subscriber database, may be operatively connected to the call controller, the defined intervals 226 and the respectively associated categories 224 of usage being stored in the storage 207. A determination module 228 may be operatively connected to the storage 207 and to the call controller 220, the determination module 228 determining for the call a current applicable category of the plurality of categories 224 for the mobile terminal.

Monitoring module 230 may be operatively connected to the call controller 220, the monitoring module monitoring a time that the call has been active on the mobile terminal. Comparator module 232 may be operatively connected to the monitoring module 230 and to the storage 207, the comparator module 232 comparing the time the call has been active to the stored interval that is associated with the current applicable category. Notification module 234 may be operatively connected to the comparator module 232 and to the call controller 220. The notification module 234 sends a predetermined notification signal to the mobile terminal 212 when the time that the call has been active exceeds the stored interval that is associated with the current applicable category.

The predetermined notification signal may also be user selectable. The predetermined notification signal may be one of a tone message, a voice message, and a visual message, and wherein each of the tone message, voice message, and visual message is selectable at the mobile terminal and storable in the telecommunication network. The respective stored messages 236 may be associated with the different categories. The tone message may be, for example, at least one of a single tone, a series of tones, a respective one of a plurality of tones that is associated with a respective one of a plurality of intervals associated with consecutive occurrences of times when the call exceeds the stored interval that is associated with the current applicable category.

During operation, the subscriber defines an interval and tone (or announcement) for each category of usage. The tone may be stored in the mobile switching center and played on the forward channel (from cell to mobile). When the subscriber is on a call, the network may monitor the minutes of usage by category. The network recognizes when the call has exceeded the subscriber-defined interval and consequently sends the subscriber the respective tone or announcement that was pre-defined and stored. Also, the network may loop through these steps, sending the tone or announcement at the end of each interval, until the call is completed or until the subscriber disables the notification during the call.

The categories may be defined by the subscriber (for example, selection from a displayed menu) at the mobile phone and/or defined at the mobile switching center. The categories of usage may be pre-defined by the service provider at the mobile switching center. The subscriber may then simply choose from a list, which categories of usage the subscriber would like to monitor and subsequently be alerted for if the defined time interval has been exceeded. For example, a service provider may allow monitoring on the following categories: 1) Prime-time voice minutes; 2) Nights/weekends voice minutes. A subscriber may only want to monitor Prime-time voice minutes.

Similarly, the intervals may be defined by the subscriber (for example, selection from a displayed menu) at the mobile phone and/or defined at the mobile switching center. In one embodiment a subscriber may choose from a display menu or type in an actual number (e.g. 5 for 5 minutes). This may also be done through a service provider by calling up customer service. Also, there may be a voice activation system where the subscriber may respond to a series of questions. For example: "Would you like to monitor prime-time voice minutes? Enter 1 for Yes or 2 for No."; "How often would you like to be alerted on prime-time voice minutes? Enter 1 for 5 minutes; 2 for 10 minutes; 3 for 30 minutes; or 4 to choose another amount of time."

The defined intervals and the respectively associated categories of usage may be stored in a subscriber database that may store information associated with each subscriber and how the feature would be customize. For example, the data may resemble the following: Minute Alerting Feature Activated: Yes; Categories to Monitor and alerting intervals: Prime time voice minutes—5 minutes;—Nights/Weekend voice minutes—30 minutes.

The category, for a call associated with a current applicable category of the plurality of categories for the mobile terminal, may be determined by time of day, day of week, and type of call (voice vs. data), etc. A timer mechanism in the mobile switching center may monitor the time that a call is up. The time that the call has been active id compared to the stored interval that is associated with the current applicable category. The mobile switching center has access to subscriber data so that when a call is set-up, the mobile switching center knows if the subscriber has the feature activated or not. In this case, the mobile switching center will check which categories are being monitored and when the alert should be given, so that in the call processing code, the category of usage is determined based on the day and time of day and type of call, and the alert is sent out if the minutes used on the current call exceeds the defined interval.

Figure 3:
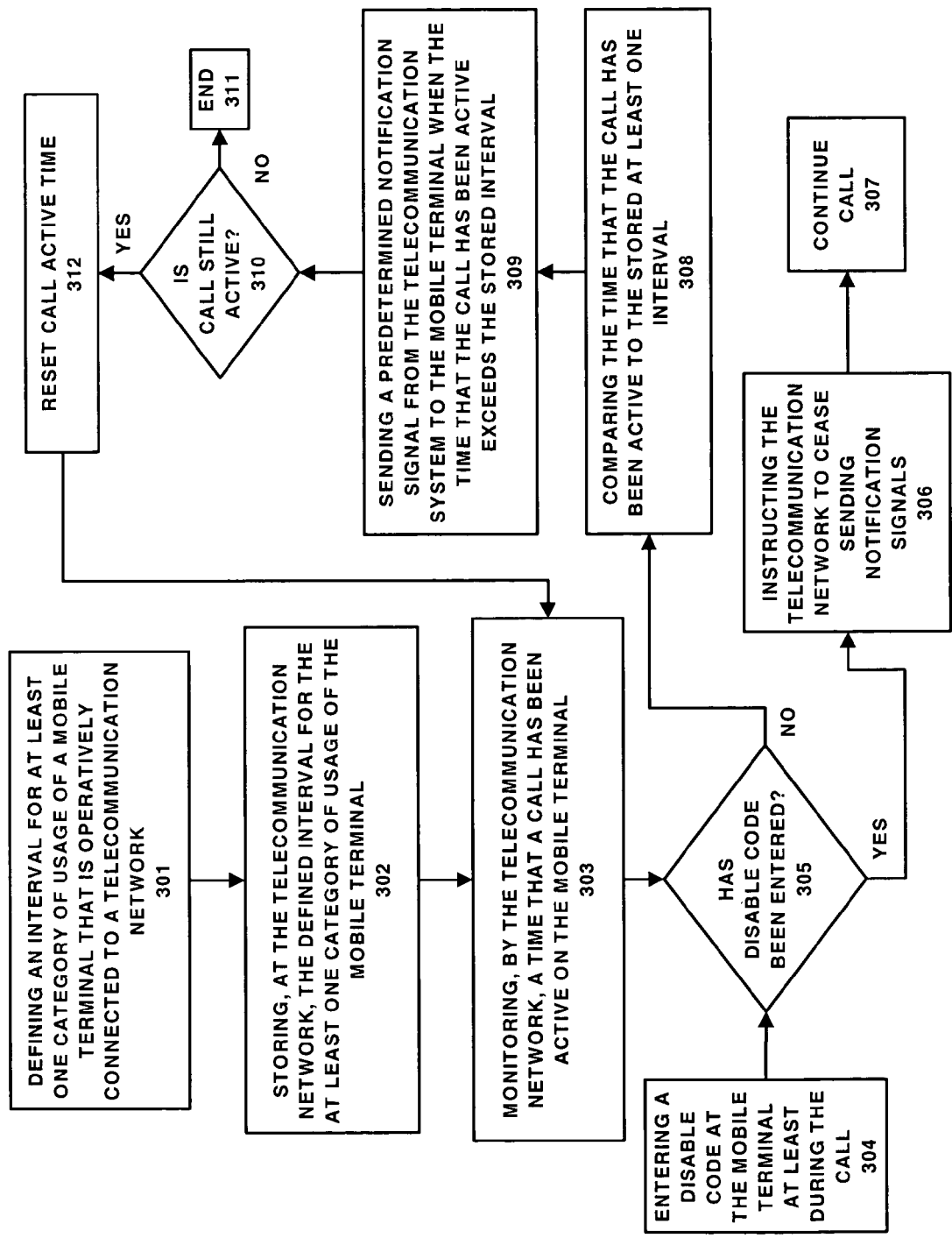
FIG. 3 illustrates a very general flow chart of logical operational steps that may be followed in accordance with one embodiment of the present method and system.

FIG. 3 is a block diagram depicting an embodiment of the present method. In very general terms, the method has the steps of: defining an interval for at least one category of usage of a mobile terminal that is operatively connected to a telecommunication network (step 301); storing, at the telecommunication network, the defined interval for the at least one category of usage of the mobile terminal (step 302); monitoring, by the telecommunication network, a time that a call has been active on the mobile terminal (step 303); entering a disable code at the mobile terminal (step 304) at least during the call, checking (step 305) if the disable code has been entered, and if it has, instructing the telecommunication network to cease sending notification signals (step 306), the call then being continued (step 307); comparing the time that the call has been active to the stored at least one interval (step 308); and sending a predetermined notification signal from the telecommunication system to the mobile terminal when the time that the call has been active exceeds the stored interval (step 309). A check is made to determine if the call is still active (step 310), and if it is not the process is ended (step 311). If the call is still active, a call active time is reset (step 312).

Figure 4:
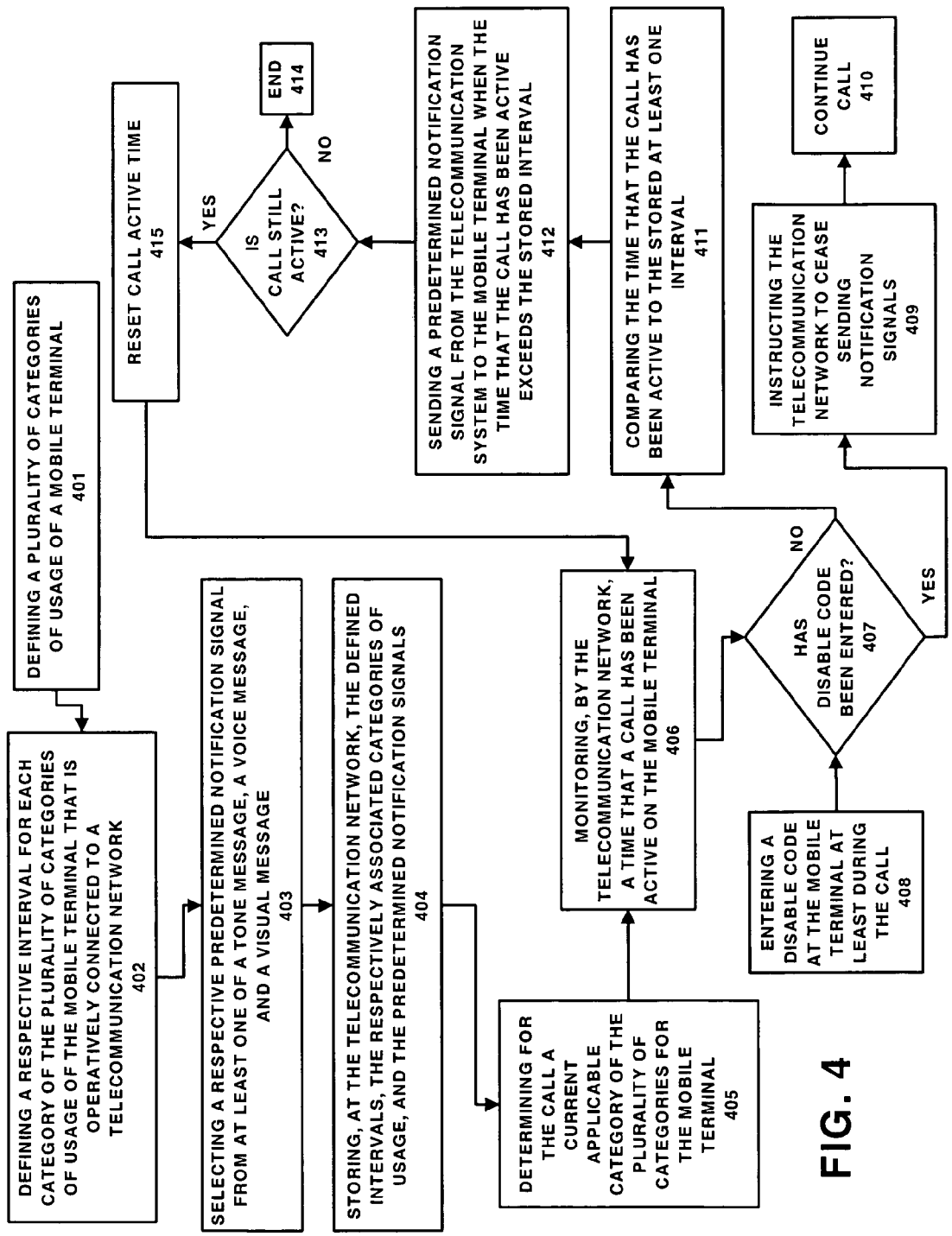
FIG. 4 illustrates another flow chart of logical operational steps that may be followed in accordance with one embodiment of the present method and system.

After the call has first exceeded the interval, the method may include again monitoring a second time that the call has been active on the mobile terminal (step 303), and sending another predetermined notification signal from the telecommunication system to the mobile terminal (step 309) when the second time that the call has been active (call active time) exceeds the stored interval that is associated with the current applicable category. FIG. 4 is a block diagram depicting another embodiment of the present method. This embodiment of the method in a telecommunications network has the steps of: defining a plurality of categories of usage of a mobile terminal (step 401); defining a respective interval for each category of the plurality of categories of usage of the mobile terminal that is operatively connected to a telecommunication network (step 402); selecting a respective predetermined notification signal from at least one of a tone message, a voice message, and a visual message, (step 403); storing, at the telecommunication network, the defined intervals, the respectively associated categories of usage, and the predetermined notification signals (step 404); determining for the call a current applicable category of the plurality of categories for the mobile terminal (step 405); monitoring, by the telecommunication network, a time that a call has been active on the mobile terminal (step 406); entering a disable code at the mobile terminal (step 408) at least during the call, checking (step 407) if the disable code has been entered, and if it has, instructing the telecommunication network to cease sending notification signals (step 409); the call then being continued (step 410); comparing the time that the call has been active to the stored at least one interval (step 411); and sending a predetermined notification signal from the telecommunication system to the mobile terminal when the time that the call has been active exceeds the stored interval (step 412). A check is made to determine if the call is still active (step 413), and if it is not the process is ended (step 414). If the call is still active, a call active time is reset (step 415).

After the call has first exceeded the interval, the method may include again monitoring a second time that the call has been active on the mobile terminal (step 406), and sending another predetermined notification signal from the telecommunication system to the mobile terminal (step 412) when the second time that the call has been active (call active time) exceeds the stored interval that is associated with the current applicable category.

The present system and method may be used with non-mobile phones, as well as, mobile phones. Also, different types of data storage devices may be used with the present method and system. For example, a data storage device may be one or more of a magnetic, electrical, optical, biological, and atomic data storage medium. The present invention overcomes the drawbacks of the prior art and provides an improved method and system in a telecommunications network for automatically notifying a subscriber that the subscriber has talked on a mobile terminal for a subscriber-defined amount of time.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for automatically notifying, by a telecommunications network, a subscriber tat the subscriber has talked on a mobile terminal for a subscriber-defined amount of time, the method comprising the steps of:
   defining, via a mobile terminal at a first predetermined time, a plurality of categories of usage of the mobile terminal;
   defining, via the mobile terminal at the first predetermined time, a respective interval for each category of the plurality of categories of usage of the mobile terminal that is operatively connected to a telecommunication network;
   storing, at the telecommunication network at the first predetermined time, the defined intervals and the respectively associated categories of usage;
   determining for a call at a second time that is later than the first predetermined time, a current applicable category of the plurality of categories for the mobile terminal;
   monitoring, by the telecommunication network, a time that a call has been active on the mobile terminal;
   comparing the time the call has been active to the stored interval that is associated with the current applicable category; and
   sending a predetermined notification signal from the telecommunication system to the mobile terminal when the time that the call has been active exceeds the stored interval that is associated with the current applicable category.

2. The method of claim 1 wherein at least one of the categories, the intervals and the predetermined notification signals are user-defined via the mobile terminal.

3. The method of claim 1 wherein the method further comprises, after the call has first exceeded the interval, again monitoring a second time that the call has been active on the mobile terminal, and sending another predetermined notification signal from the telecommunication system to the mobile terminal when the second time that the call has been active exceeds the stored interval that is associated with the current applicable category.

4. The method of claim 1 wherein the method further comprises periodically monitoring the time that the call has been active on the mobile terminal, and sending the predetermined notification signal from the telecommunication system to the mobile terminal upon each occurrence of the time that the call has been active exceeding the stored interval that is associated wit the current applicable category.

5. The method of claim 1 wherein the predetermined notification signal comprises at least one of a tone message, a voice message, and a visual message, and wherein each of the tone message, voice message, and visual message is selectable at the mobile terminal and storable in the telecommunication network.

6. The method of claim 1 wherein the method further comprise selecting and storing a respective predetermined notification signal from at least one of a tone message, a voice message, and a visual message, and wherein each of the tone message, voice message, and visual message is selectable at the mobile terminal and storable in the telecommunication network.

7. The method of claim 6 wherein the tone message is at least one of a single tone, a series of tones, a respective one of a plurality of tones that is associated with a respective one of a plurality of intervals associated with consecutive occurrences of times when the call exceeds the stored interval tat is associated with the current applicable category.

8. The method of claim 1 wherein the categories comprises at least one of daytime minutes, nighttime minutes, peak minutes, weekday minutes, and weekend minutes.

9. The method of claim 1 wherein the method further comprises entering a disable code at the mobile terminal at least during the call, the disable code instructing the telecommunication network to cease sending notification signals.

10. A system for providing automatic notification, by a telecommunications network, to a subscriber that the subscriber has talked on a mobile terminal for a subscriber-defined amount of time, the system comprising:
   a mobile terminal that is operatively connected to a telecommunication network;
   a call controller in the telecommunication network for controlling a call for the mobile terminal;
   a plurality of categories of usage of a mobile terminal;
   a respective interval for each category of the plurality of categories of usage;
   a storage in the telecommunication network operatively connected to the call controller, the defined intervals and the respectively associated categories of usage being stored in the storage;
   determination module operatively connected to the storage and to the call controller, the determination module determining for the call a current applicable category of the plurality of categories for the mobile terminal;
   monitoring module operatively connected to the call controller, the monitoring module monitoring a time that the call has been active on the mobile terminal;
   comparator module operatively connected to the monitoring module and to the storage, the comparator module comparing the time the call has been active to the stored interval tat is associated with the current applicable category; and
   notification module operatively connected to the comparator module and to the call controller, the notification module sending a predetermined notification signal from the telecommunication system to the mobile terminal when the time that the call has been active exceeds the stored interval that is associated with the current applicable category.

11. The system of claim 10 wherein at least one of the categories, the intervals and the predetermined notification signals are user-defined via the mobile terminal.

12. The system of claim 10 wherein the monitoring module, the comparator module and the notification module are structured such that, after the call has first exceeded the interval, again monitoring a second time that the call has been active on the mobile terminal, and sending another predetermined notification signal from the telecommunication system to the mobile terminal when the second time that the call has been active exceeds the stored interval that is associated with the current applicable category.

13. The system of claim 10 wherein the method further comprises periodically monitoring the time that the call has been active on the mobile terminal, and sending the predetermined notification signal from the telecommunication system to the mobile terminal upon each occurrence of the time that the call has been active exceeding the stored interval that is associated with the current applicable category.

14. The system of claim 10 wherein the predetermined notification signal comprises at least one of a tone message, a voice message, and a visual message, and wherein each of the tone message, voice message, and visual message is selectable at the mobile terminal and storable in the telecommunication network.

15. The system of claim 10 wherein respective predetermined notification signals are stored for at least one of a tone message, a voice message, and a visual message, and wherein each of the tone message, voice message, and visual message is selectable at the mobile terminal and storable in the telecommunication network.

16. The system of claim 15 wherein the tone message is at least one of a single tone, a series of tones, a respective one of a plurality of tones tat is associated with a respective one of a plurality of intervals associated wit consecutive occurrences of times when the call exceeds the stored interval that is associated with the current applicable category.

17. The system of claim 10 wherein the categories comprises at least one of daytime minutes, nighttime minutes, peak minutes, weekday minutes, and weekend minutes.

18. The system of claim 10 wherein the system further comprises a disable code that is enterable at the mobile terminal at least during the call, the disable code instructing the telecommunication network to cease sending notification signals.

* * * * *